March 30, 1943.  A. O. OLSEN  2,315,218
PISTON RING
Filed Nov. 23, 1940
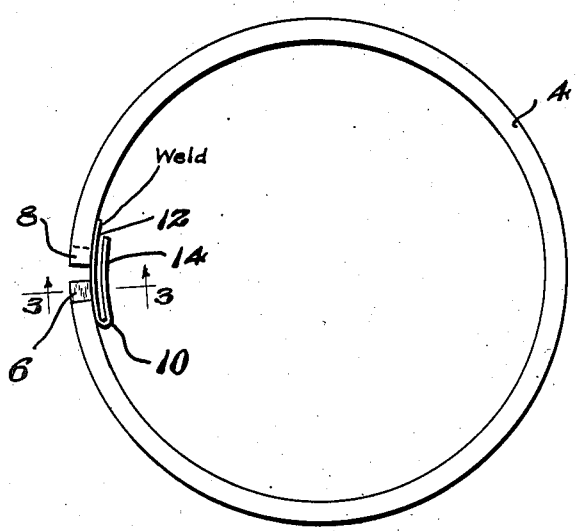
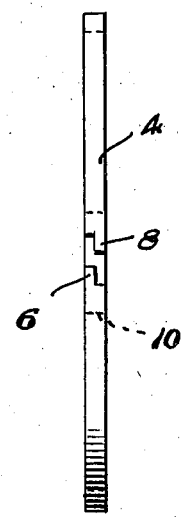
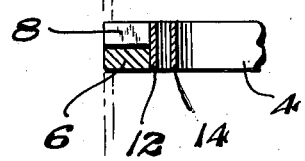
Inventor
Arnt Olaf Olsen
By J. Preston Swecker
his Attorney Patented Mar. 30, 1943

2,315,218

UNITED STATES PATENT OFFICE 2,315,218

PISTON RING

Arnt Olaf Olsen, Seattle, Wash.

Application November 23, 1940, Serial No. 366,899

1 Claim. (Cl. 309—46)

This invention relates to an improvement in piston rings, used on the pistons of motors and engines for the purpose of sealing the space between the piston and cylinder wall.

The object of this invention is to provide a piston ring that is self-adjustable to the cylinder wall and will be perfectly sealed to eliminate blowby of the pressure past the piston and rings in the cylinder when used in conjunction with cylinder walls that vary in lateral cross-sectional diameter, in the travel of the piston in the upward and downward movement.

In the accompanying drawing, I have illustrated a simple and preferred form of the invention; it being, however, understood that no limitation is necessarily made to the precise structural detail therein exhibited, but that changes, alterations, and modifications within the scope of the claim may be resorted to when desired.

In the accompanying drawing:

Figure 1 is a plan view of a piston ring, showing the invention applied thereto;

Figure 2 is an edge view in elevation thereof;

Figure 3 is a detail cross section thereof, on the line 3—3 of Fig. 1.

The invention is shown as applied to a piston ring of the split spring type, designated generally by the numeral 4 having tongued lapped ends 6 and 8, respectively, adapted to overlap each other when the ring is closed and in use in the groove of the piston.

The numeral 10 designates generally a spring tongue formed of a flat strip of spring material which is doubled back upon itself to form spaced arms indicated at 12 and 14, respectively, which extend substantially parallel with each other as shown in Fig. 1, and both of said arms overlap opposite sides of the lapped ends 6, 8, so that the looped end of the tongue is on one side of the crack between said lapped ends, while the free ends of said arms are on the opposite side of said crack. The free end of the arm 12 is secured directly to the inner side of the piston ring 4, as by spot-welding at the point indicated by "Weld" in Fig. 1 of the drawing.

When the piston ring is in the groove of the piston, the spring tongue 10 has the arms pressing outwardly against the bottom of the groove and against the inner side of the ring, substantially as indicated in Fig. 3, where the cylinder wall is designated C and the periphery of the piston is designated generally at P. The spring tongue thus forces the lapped ends of the piston tightly against the cylinder wall, and it also closes the space or gap between the lapped ends 6, 8, as will be evident from Fig. 3, which thereby prevents a leakage through this gap of the gases from the explosion due to the pressure created thereby. Thus the piston ring with the spring tongue therein is self-adjustable to the cylinder walls, and also seals perfectly to prevent blow-by of the pressure through the gap in the ends of the ring. This effectively holds the compression pressure in the cylinder and prevents a leakage past the ring.

I claim:

In a piston ring, the combination of a circular split ring having tongued lapped ends, and a spring tongue doubled back upon itself forming spaced approximately parallel arms with said arms overlapping the lapped ends on opposite sides of the slit therebetween, said spring tongue having the doubled back portion thereof at one side of the lapped ends and the arms extending to the opposite side of said lapped ends with one of said arms welded on the inside of said ring at the opposite side of said lapped ends from the doubled back portion of said spring tongue, to shut off the blow-by of oil at said lapped ends.

ARNT OLAF OLSEN.